June 4, 1957 E. W. HAWKINSON 2,794,351
METHOD OF PRODUCING TIRE MOLDS
Filed May 14, 1956 2 Sheets-Sheet 1
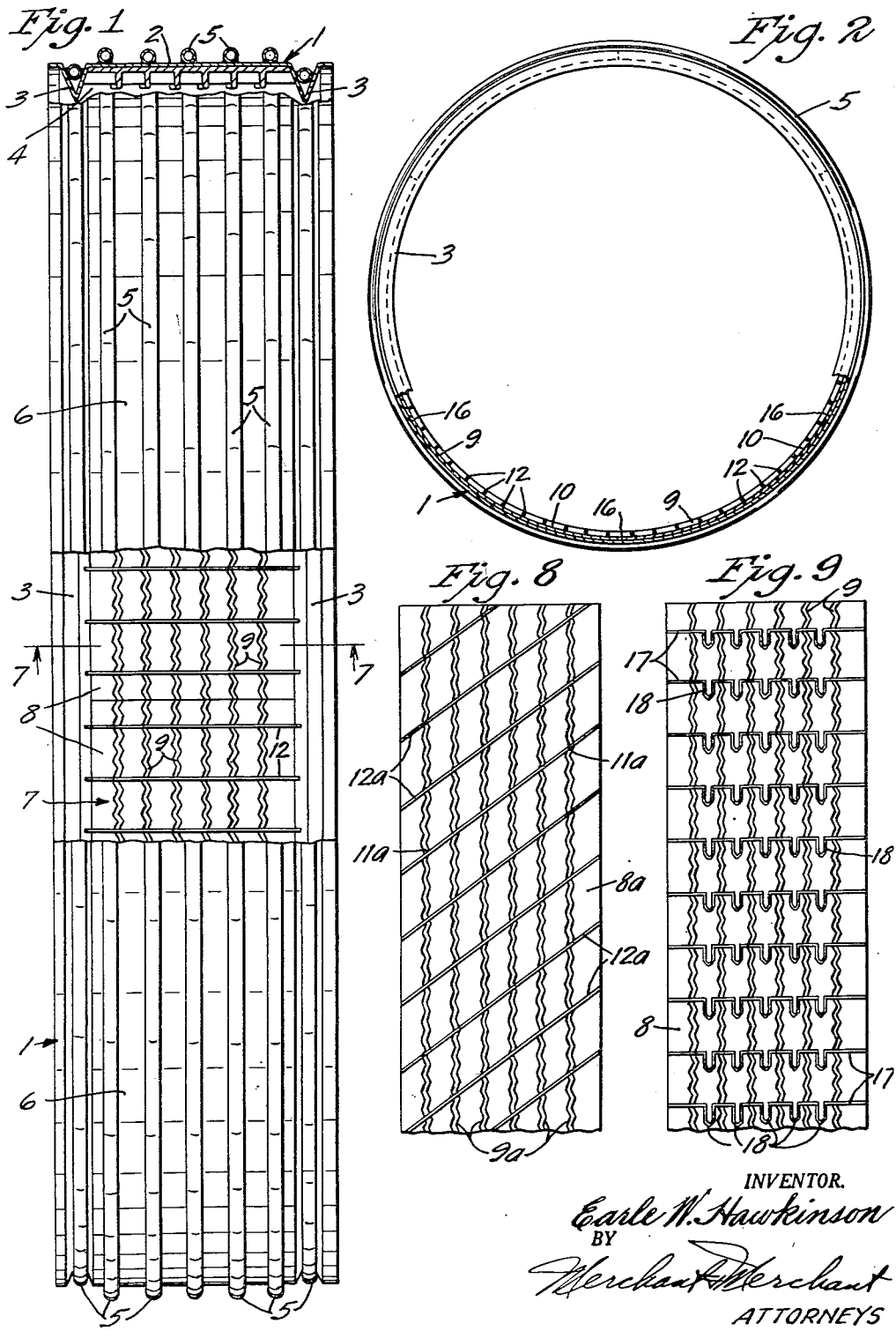
INVENTOR.
Earle W. Hawkinson
BY
Merchant & Merchant
ATTORNEYS June 4, 1957  E. W. HAWKINSON  2,794,351
METHOD OF PRODUCING TIRE MOLDS
Filed May 14, 1956  2 Sheets-Sheet 2
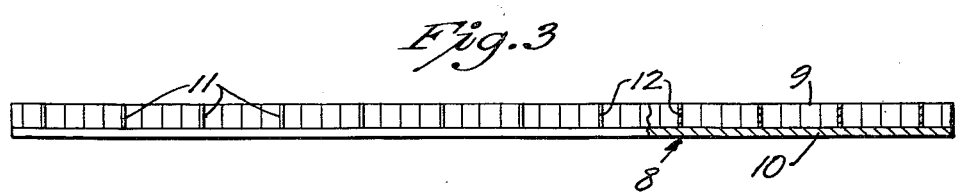
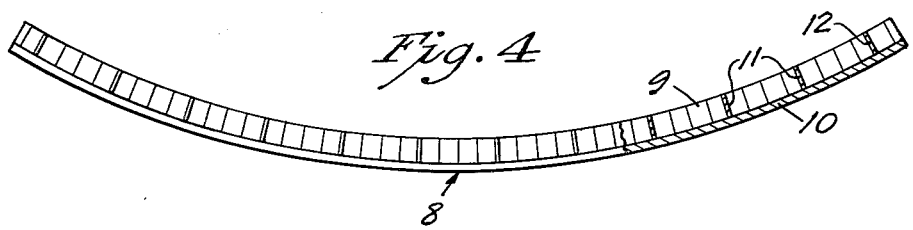
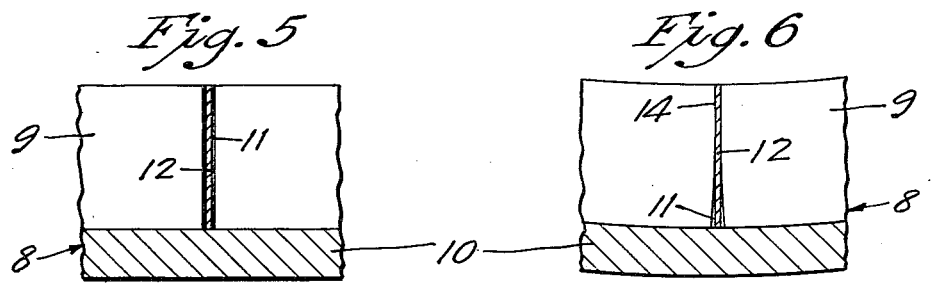
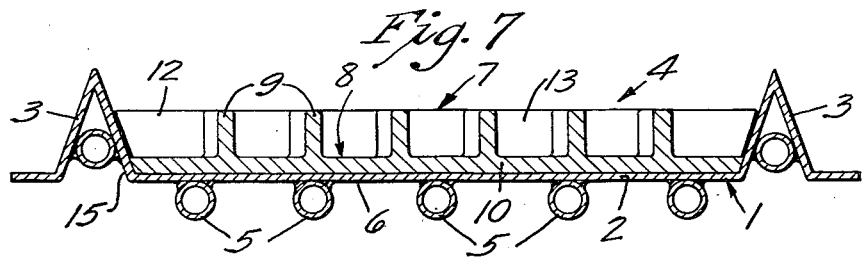
INVENTOR.
Earle W. Hawkinson
BY
Merchant & Merchant
ATTORNEYS United States Patent Office 2,794,351
Patented June 4, 1957

2,794,351

METHOD OF PRODUCING TIRE MOLDS

Earle W. Hawkinson, Minneapolis, Minn., assignor to Paul C. Hawkinson Company, Minneapolis, Minn., a corporation of Minnesota Application May 14, 1956, Serial No. 584,642

3 Claims. (Cl. 76—107)

My invention relates to molds for applying treads to pneumatic tire casings and to a novel method of forming same.

More particularly my invention relates to a novel tire retreading mold and a novel method of forming same with relatively thin transversely extended rider-strip-sipeing or slit producing blades or strips therein.

The primary object of my invention is a provision for a mold and method of the type above described which is relatively inexpensive to produce, which is durable and which produces highly efficient pneumatic tire threads or retreads.

The above and still further objects of my invention will become apparent from the following detailed specification, appended claims and attached drawings.

Referring to the drawings wherein like characters indicate like parts throughout the several views:

Figure 1 is a view in end elevation, some parts being broken away and some parts being shown in section;

Figure 2 is a view in side elevation on a reduced scale, some parts being broken away and some parts shown in section;

Figure 3 is a view in side elevation of a matrix section in one stage of my novel process, some parts being broken away and some parts being shown in section;

Figure 4 is a view corresponding to Figure 3 but showing the matrix section after a further step in my novel process;

Figure 5 is an enlarged fragmentary view of the section portion of Figure 3;

Figure 6 is an enlarged fragmentary view of the section portion of Figure 4;

Figure 7 is an enlarged view in transverse section as seen from the line 7—7 of Figure 1;

Figure 8 is a view in elevation of a matrix section illustrating a somewhat modified arrangement of the parts; and Figure 9 is a view corresponding to Figure 8 by showing a still further modification of my invention.

Referring with greater particularity to the drawings, the numeral 1 indicates in its entirety an annular jacket, preferably formed from an endless band of sheet metal and including cylindrical central portion 2 and radially inwardly projecting generally U-shaped confining flanges 3 which together define an endless tread design forming cavity 4. Heat is imparted to the jacket by any suitable means such as a spirally wound heating coil or steam conduit 5 brazed or otherwise secured to its exterior peripheral surface 6.

As shown particularly in Figure 7, the annular jacket 1 is provided with an endless matrix 7 made up of a plurality of matrix sections 8. In accordance with my invention the matrix sections 8 are made initially in the flat generally rectangular form of Figure 3 from bendable cast aluminum or the like, and include a plurality of laterally spaced, generally parallel, longitudinally extended tread design forming ribs 9 which upstand from a continuous relatively thin base 10. As shown in Figures 1 and 7, the bases 10 of the matrix sections 8 are of a width corresponding to the cylindrical portion 2 of the jacket 1.

As a step in my novel process, I slit the ribs 9 transversely as by a saw-blade, whereby the slits 11 of one of the ribs 9 are in lateral alignment with the slits 11 in the immediately adjacent rib 9. As shown, the slits 11 are co-extensive in depth with the height of the ribs 9 and extend completely therethrough, whereby relatively thin blades or tread sipeing strips 12 may be placed therein, as shown particularly in Figure 7. The sipeing strips 12 are initially snugly received within the slits 11 and extend into and through the rider strip forming cavities 13 defined by the ribs 9. The opposite ends of the sipeing strips 12 preferably engage the confining flanges 3.

In the next step in my novel process, the tread matrix sections 8 are bent into the segmental form of Figure 4, whereby to tend to cause the ribs 8 to close the slits 11 at their upper ends, as indicated by the numeral 14 in Figure 6. Obviously this force exerts a terrific pinching action as at 14 upon the sipeing blades 12 between the slits 11, thereby securely anchoring same against accidental removal.

As a final step in my novel method, the segmental matrix sections 8 are secured to the inner peripheral surface of the cylindrical portion 2 of the jacket 1 intermediate the confining flanges 3, by any suitable means. Note that the opposite longitudinal side edges 15 are in engagement with the confining flanges 3 whereas the opposite ends 16 thereof are in abutting relationship see Figure 1, whereby the matrix 7 extends completely about the circumference of the jacket 1.

In the modified form of my invention shown in Figure 8, the matrix sections 8a are provided with tread design forming ribs 9a. The slits 11a, while aligned, here also are angularly disposed with respect to the transverse axis of the matrix section 8; whereas the slits 11 of Figure 3 are parallel to the transverse axis of the matrix sections 88. As a consequence the tread sipeing blades or strips 12a likewise extend angularly with respect to the transverse axis of the matrix sections 8a.

Figure 9 illustrates a still further but slightly modified form of the invention. As there shown, the matrix sections 8 are in all respects identical to the matrix sections 8 of Figure 3, but the sipeing blades or strips 17 are formed to provide U-shaped sipeing elements 18 intermediate each of the tread design forming ribs 9.

My invention has been thoroughly tested and found to be completely satisfactory for the accomplishment of the above objects, and while I have disclosed a preferred and several modified forms of my invention, I wish to make it understood that the same is capable of still further modification without departure from the scope and spirit of the invention as defined in the claims.

What I claim is:

1. The method of forming a mold for applying treads to pneumatic tire casings which comprises the steps of forming a plurality of matrix sections in flat form which have upstanding laterally spaced longitudinally extended tread design forming ribs thereon, said ribs being provided with a plurality of relatively narrow transverse slits therethrough, placing within said slits relatively thin metal tread-sipeing strips which project therefrom into the adjacent tread forming space between said ribs, bending said matrix sections into arcuate form whereby the strips within said slits will be pinched within said slits and thereby securely anchored therewithin, and thereafter securing said arcuate matrix sections in continuous end-to-end relationship about the interior surface of an annular jacket.

2. The method of producing molds for the application of treads to pneumatic tire casings which comprises forming an annular jacket, forming a plurality of relatively flat matrix sections from bendable cast metal, said matrix sections having a plurality of upstanding laterally spaced generally parallel tread design forming ribs therein which extend longitudinally thereof, slitting said ribs generally transversely thereof and in a manner whereby the slits of one rib are in alignment with the slits of the adjacent rib, placing strips of relatively thin tread-sipeing metal in said slits, bending the said mold sections into arcuate form whereby the metal strip will be pinched and securely anchored in said slits, and thereafter securing said matrix sections in end-to-end abutting relationship about the interior surface of said annular jacket.

3. The method defined in claim 1 in which said slits are co-extensive in depth with said ribs.

References Cited in the file of this patent

UNITED STATES PATENTS

| | | |
|---|---|---|
| 1,880,430 | Furnas | Oct. 4, 1932 |
| 2,710,424 | Kraft et al. | June 14, 1955 |
| 2,732,589 | Steadman | Jan. 31, 1956 |